United States Patent

[11] 3,579,121

[72] Inventor Eugen Haag
Karlsruhe, Germany
[21] Appl. No. 791,463
[22] Filed Jan. 15, 1969
[45] Patented May 18, 1971
[73] Assignee Siemens Aktiengesellschaft
Berlin and Munich, Germany
[32] Priority Feb. 16, 1968
[33] France
[31] 140,140

[54] APPARATUS FOR DETECTING NONRECURRENT PULSES IN THE NANOSECOND RANGE WITH A DELAY LINE
11 Claims, 4 Drawing Figs.
[52] U.S. Cl. .................................................. 328/124,
328/56, 328/151
[51] Int. Cl. ........................................... G11c 11/26
[50] Field of Search ........................................... 328/55, 56,
60, 61, 103, 105, 116, 117, 122, 124, 151;
307/223, 293

[56] References Cited
UNITED STATES PATENTS
3,172,043   3/1965   Altman.......................... 328/151X
OTHER REFERENCES
"Single-Pulse Sampling Circuit" by Anderson in IBM Technical Disclosure Bulletin, Vol. 9, No. 4, Sept. 1966, page 381

*Primary Examiner*—Stanley D. Miller, Jr.
*Attorney*—Edwin E. Greigg

ABSTRACT: An apparatus for obtaining, with a delay, amplitude values of a nonrecurrent signal pulse of a duration in the nanosecond or subnanosecond range. The signal pulse is applied to a delay line having a plurality of spaced taps, to each of which there is connected a sampling station. Entering the delay line, the signal pulse triggers a scanning signal that travels along a scanning signal path with a speed different from the speed of the signal pulse traveling in the delay line. Thus, the scanning signal either overtakes or falls behind the signal pulse and during such a relative travel it scans the signal pulse and causes storing of individual amplitude values in said sampling stations from which the stored values may be sequentially picked up for a visible recording of the signal pulse curve.

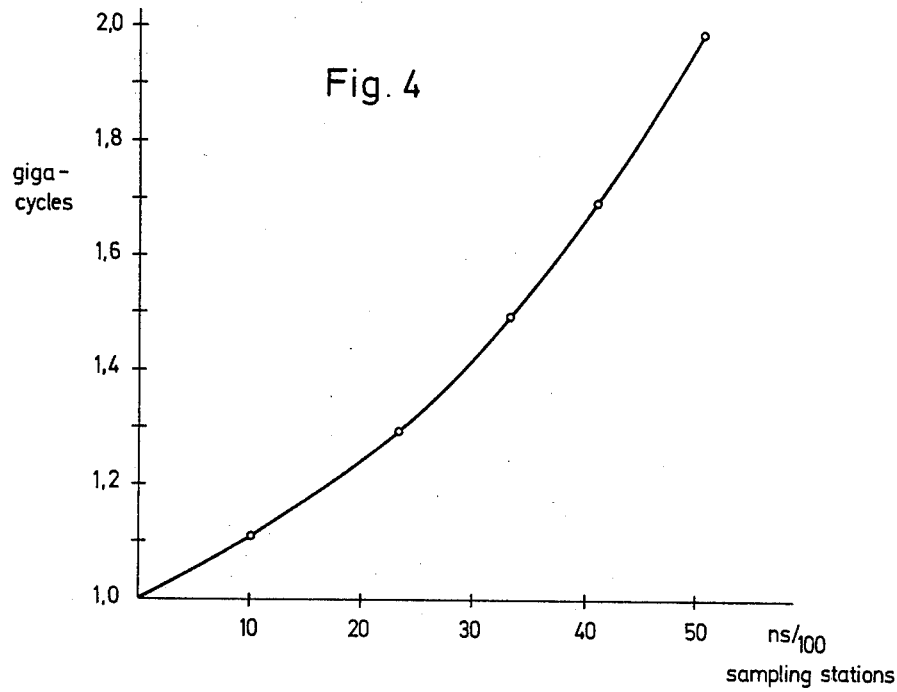
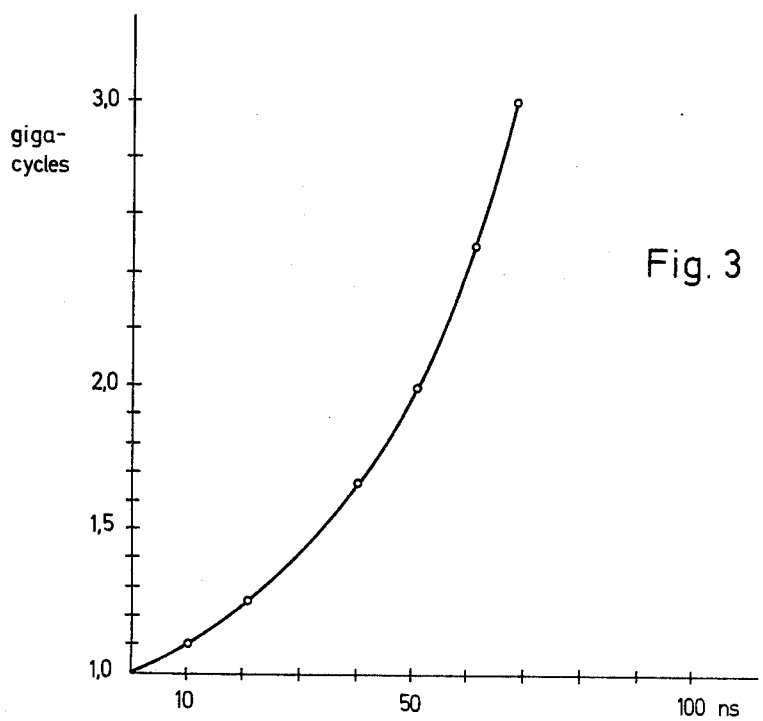

APPARATUS FOR DETECTING NONRECURRENT PULSES IN THE NANOSECOND RANGE WITH A DELAY LINE

BACKGROUND OF THE INVENTION

The amplitude curve of nonrecurrent pulses in the nanosecond and subnanosecond range may be visibly recorded with conventional electron beam oscillographs only if the pulse-amplitudes have a value of several volts and thus the signal may be directly applied to the deflecting plates of the cathode-ray tube. If amplification is necessary for the visible representation of a signal, in conventional direct time sweep cathode ray oscillographs pulse growths of 2.4 nanoseconds may be obtained. A photographic recording of such short pulses is possible only on the most sensitive films.

There are a great number of very short nonrecurrent phenomena or conditions represented by a single, small-amplitude signal, the visible recording of which would be of substantial scientific or technical value. With the presently known means, however, such pulse cannot be reproduced in a visible and permanent manner.

For the visible recording of recurrent pulses of very short duration, the so-called sampling method is used. According to this method, from each recurrent, identical pulse a different amplitude value of the pulse curve is picked up and then the values so sampled are rebuilt to form a complete curve representing an individual recurrent pulse. Since this known sampling method is operative only in case of a plural recurrence of the pulse representing the same phenomenon, it may be of no use itself in case of nonrecurrent signals of a duration in the nanoseconds or subnanosecond range.

OBJECT AND SUMMARY OF THE INVENTION

It is the principal object of the invention to provide an apparatus for obtaining visibly recordable data pertaining to the curve particularly of a low-amplitude, nonrecurrent pulse representing an occurrence or condition of a duration in the nanosecond or subnanosecond range.

Briefly stated, according to the invention, the electric signal representing the condition or phenomenon are designated hereinafter as the "signal pulse," is applied to a delay line having a plurality of nonreflecting taps and terminated with its wave resistance. As the signal pulse enters the delay line, it generates, by tripping a trigger circuit, a sweep or scanning signal in a signal path which is connected to said taps parallel to said delay line. The scanning signal proceeds along the signal path with a speed different from the traveling speed of the signal pulse in the delay line and is generated in such a manner that as the signal pulse passes by the taps, subsequent instantaneous values thereof are scanned by the scanning signal and stored for pick up.

The invention will be better understood and further objects as well as advantages will become more apparent from the ensuing detailed specification of a preferred, although exemplary, embodiment taken in conjunction with the drawings.

BRIEF DESCRIPTION OF THE DRAWINGS

FIG. 3 shows a graph of the required scanning frequency as a function of the duration of the signal pulse; and FIG. 4 is a graph of the scanning frequency as a function of the relative time scale.

DESCRIPTION OF THE METHOD

Figure 1:
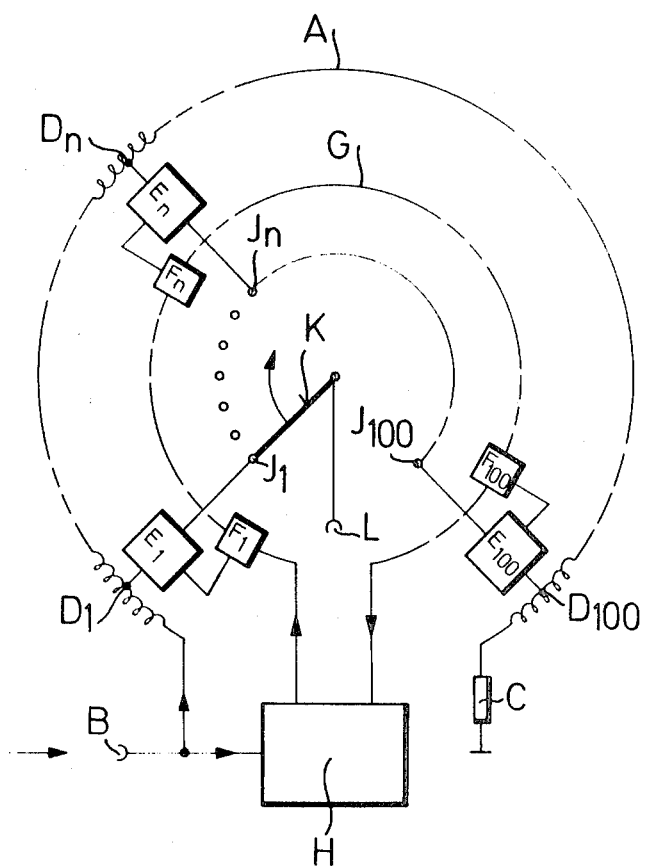
FIG. 1 is a schematic diagram of a preferred embodiment for practicing the invention.

The signal pulse is applied to a delay line which is provided with a plurality of spaced taps, to each of which there is connected a sampling or pickup station. The delay line is terminated by its wave resistance.

As the signal pulse enters the delay line, at its entrance it commands a control circuit to emit scanning pulses that proceed along a signal path connected with each sampling station and thus coupled parallel with the delay line.

The traveling speed of the signal pulse in the delay line and that of the scanning pulses in the signal path differ from one another.

It is preferred that the time lag between scanning pulses appearing on two subsequent taps or, stated differently, the traveling time of the scanning pulses between two sampling or detecting stations, be smaller than the traveling time of the signal pulse in the delay line between two taps. In such a case the signal pulse is overtaken by the scanning pulses. In principle, however, it is also possible that the scanning speed is the smaller. In such a case the scanning signal falls behind the signal pulse. The signal path for the scanning pulses connected parallel with the delay line may be a counting chain of known structure, e.g. a shift register or a ring counter. As the signal pulse enters the delay line, the counting chain is automatically started.

The sampling stations associated, as noted before, with the taps of the delay line are sequentially energized by individual stages of the counting chain. These stages, in turn, are sequentially actuated by the scanning signal traveling in the signal path. In case the scanning process is faster than the travel of the signal pulse in the delay line, the signal pulse is slowly overtaken by the scanning pulses. As a result, the signal pulse is scanned beginning at its trailing end so that the amplitude values representing spaced points or individual instantaneous values on the signal pulse curve are stored in a reverse time sequence in the subsequent sampling stations.

The aforedescribed process makes possible a dual effective extension of the duration of the signal pulse to thus, in effect, substantially lengthen the time period available for the visible recording. A first extension of this time period is obtained by utilizing, for visible signal recording, the entire traveling time characteristic of the delay line. A second extension of the time period may occur when the sensed instantaneous values of the signal pulse are stored in the sampling stations. For example, it is possible to achieve a $10^8$-fold extension, so that a signal pulse lasting 1 nanosecond may be recorded where the recording period is 100 milliseconds. It is to be noted that the amplitudes of the signal pulse need not be more than a few millivolts.

It is to be understood that for the signal path for the scanning or sampling pulses, a second delay line may be used.

It is a condition of the applicability of the aforediscussed method that the duration of each individual scanning step performed by the scanning pulses be substantially shorter than the traveling time of the signal pulse between two immediately adjacent taps of the delay line. This condition, however, may be met without difficulty.

The sampling stations coupled to the taps of the delay line are identical to those which are used in known sampling oscillographs for the recording of recurrent signal pulses as set forth in the "Background of the Invention."

At a predetermined moment each sampling station is energized, as noted before, by a scanning pulse emitted by the counting chain and an amplitude of the signal pulse present at the tap in that moment is stored by the sampling station without interfering with the signal pulse. This is possible if the sampling stations are arranged as a symmetrical scanning bridge such as used in known sampling oscillographs for recurrent signal pulses.

The instantaneous amplitude values of the signal pulse obtained as explained above are picked up from the sampling stations and by means of a suitable recording device are reproduced to form an analog pictorial representation of the signal pulse. For this purpose cathode-ray tube XY–writers, or other known analog or digital evaluating devices may be used. After the signal pulse has completed its travel in the delay line, the counting chain and the sampling stations are reset into their starting or initial condition.

For determining the duration of the signal pulse from the recorded signal, considerations as set forth below are to be taken into account. The scanning pulses, which may form a sinusoidal signal with a definite beginning, are generated upon command from a trigger circuit when the latter is tripped by the leading end of the signal pulse as it enters the delay line. The continuously adjustable output signal of the trigger circuit is delayed until the signal pulse has entered in its entirety the delay line. At that moment the scanning pulses are automatically started and instantaneous amplitude values of the signal pulse curve are scanned starting from the trailing end of the signal pulse. The relative duration of scanning the entire signal pulse, that is, the time period within which all detected individual amplitude values of the signal pulse are available, is $T_{rel}=(T_1-T_{samp}) \cdot 100$, wherein $T_{l,1}$ is the traveling time of the signal pulse between two immediately adjacent taps of the delay line and $T_{samp}$ is the traveling time of the scanning pulses between two immediately adjacent detecting or pickup stations. The number of detecting stations is assumed here to be 100. The relative duration of scanning the entire signal pulse is shorter, by the duration of the signal pulse in the delay line, than the traveling time of the signal pulse in the delay line. Assuming a traveling time $T_{l,1}=1$ nanosecond and a scanning pulse frequency of 1.11 gigacycles or $T_{samp}=0.9$ nanoseconds, one obtains $T_{rel}=10$ nanoseconds. Thus, upon completion of this time period, every sampling station stores an amplitude value, the entirety of which represents the signal pulse curve.

For generating the scanning or counting chain pulses, a fixed frequency generator may be used in conjunction with a variable frequency generator, the frequency of which is made dependent upon the time scale. Maximum accuracy is required in case of the fastest time scale because there the difference between the traveling time of the signal pulse from one tap to an immediately adjacent one and the traveling time of the scanning pulses from one sampling station to an immediately adjacent one is the smallest. The fixed frequency may be generated by means of a quartz crystal controlled generator with an accuracy of $10^{14}$. The time scale-dependent frequency is, in the case of the fastest time scale only 10 megacycles. For this frequency an easily attainable accuracy of $10^{12}$ is sufficient. For generation of the scanning pulse frequency, the aforedescribed two frequencies are mixed with one another.

The noise pulses which may be generated by the scanning process and which may have entered the delay line are absorbed in the terminal impedance circuit thereof. These noise pulses, however, also travel opposite the direction of travel of the signal pulse and in case of an inadequately terminated signal pulse source may generate reflections which distort another, subsequent signal pulse to be examined. This source of error may be eliminated by building damping members into the delay line thus giving the latter nonreciprocal transmission properties.

The traveling time, itself, of the counting chain with which the scanning process is performed, has to be taken into account only in case of large time scales. The switching time of the individual counting stages is also negligible; it causes a parallel shift of the scanning process with respect to the moment the signal pulse enters the delay line.

In case the control circuit associated with the counting chain and the trigger circuit tripping the control circuit have a large response time, the signal pulse may be further delayed by another delay means coupled before the delay line. In such a case, triggering occurs before the signal pulse enters the delay line.

It is within the scope of the invention to compare two signal pulses by associating a second delay line (having taps and sample stations coupled thereto) with the counting chain. In such a case both delay lines are suitably tuned to the same traveling time.

DESCRIPTION OF THE PREFERRED EMBODIMENT

Turning now to FIG. 1, there is shown a delay line A having a substantially circular configuration. The delay line A has an input terminal B and is closed with a terminal impedance C. Along the whole length of the delay line, there are distributed equally spaced taps D which, in this embodiment, are 100 in number and are designated $D_1,...D_n...D_{100}$. To each tap there is connected a sampling station E, designated $E_1...E_n...E_{100}$. Each sampling station E is controlled by a counting stage F, designated $F_1,...F_n...F_{100}$ and connected in series to form a counting chain constituting a scanning signal path G. By arranging the counting chain concentrically with and inside of delay line A, the traveling time of the scanning pulses in the counting chain is maintained at a low value. If, for example, the diameter of the counting chain is 30 centimeters, the last-named traveling time is about 10 nanoseconds. The counting chain forming the scanning signal path G is energized by a control circuit H, which, in turn, is connected to the input terminal B of the delay line A. The sampling stations $E_1-E_{100}$ are provided with output terminals $J_1-J_{100}$ which may be contacted in succession by a switch means K. Instead of a mechanical device as shown in FIG. 1, the switch means K may be a relay circuit or a purely electronic switching circuit. The amplitude values stored in each sampling station E by the method described hereinbefore are thus sequentially picked up by switch means K and may be applied through terminal L to a recording device or other pulse evaluating apparatus not shown.

Figure 2:
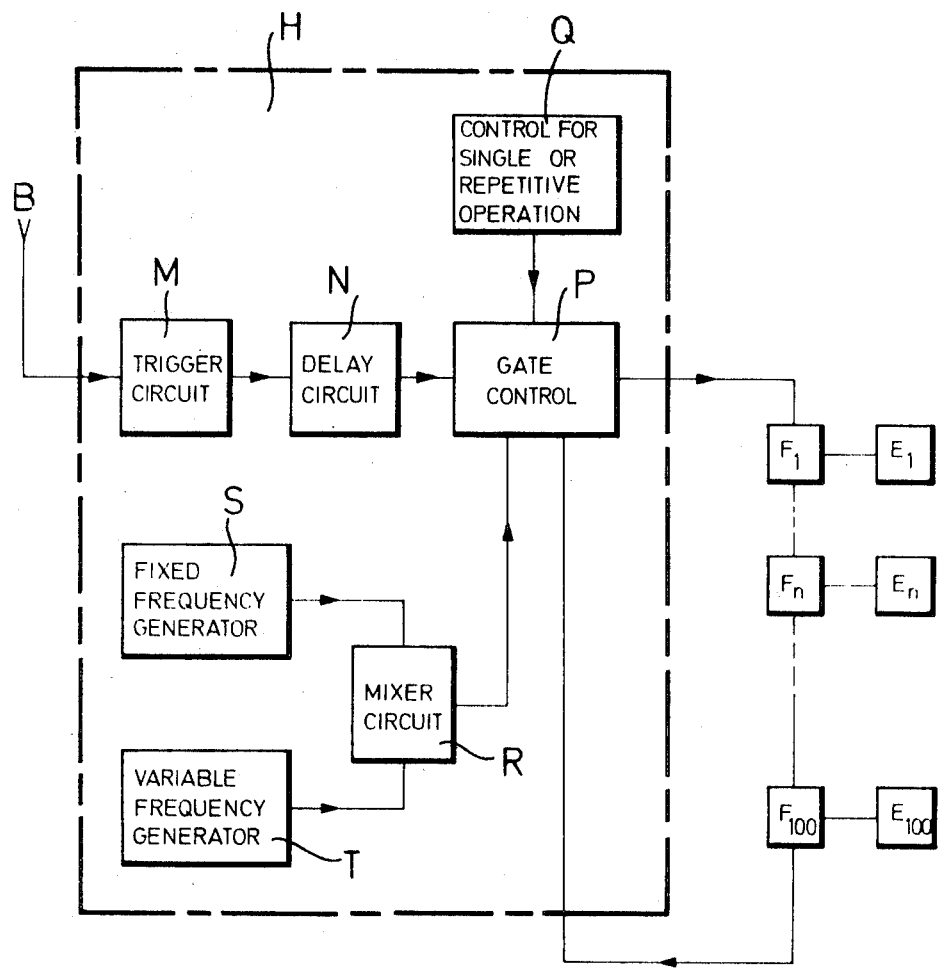
FIG. 2 is a schematic diagram showing the control circuit for generating scanning signals in greater detail.

Turning now to FIG. 2, the control circuit H, shown in greater detail, is enclosed within the rectangle illustrated in broken lines.

As the signal pulse, on its way to delay line A, passes through input terminal B, it energizes a trigger circuit M. Thereupon in the latter a trigger signal is generated which enters an adjustable delay circuit N. Therefrom, the trigger signal enters a gate control P which may be set, for either single or repetitive operation, by a gate adjusting means Q coupled to control P. The gate control P receives scanning pulses from a mixer R which, in turn, is supplied from a fixed frequency generator S and a variable frequency generator T. The gate control P transmits the scanning or counting pulses to the counting chain (e.g. a ring counter or shift register) formed of individual counting stages $F_1-F_{100}$ when commanded by the signal from delay circuit N. When the scanning signal reaches the counting stage $F_{100}$, a resetting pulse is transmitted therefrom to the control stage P. Thereupon a subsequent signal pulse may be applied to terminal B.

Turning now to FIG. 3, the abscissa of the coordinate system represents the duration of the signal pulse in nanoseconds while the ordinate represents the scanning pulse frequency in gigacycles. The course of the curve shows that as the duration of the signal pulse decreases, lower scanning frequencies are required. The invention is thus particularly adapted for signal pulses of short duration.

In FIG. 4 the abscissa of the coordinate system represents the relative time scale in nanoseconds/100 sampling stations. The ordinate again represents the scanning pulse frequency in gigacycles. The course of this curve again shows that for shorter relative time scales, lower scanning frequencies are required.

I claim:

1. An apparatus for obtaining visibly recordable signal pulses particularly of the nonrecurrent type and of a duration in the nanosecond and subnanosecond range, comprising,
    A. a delay line having
        1. an input terminal to which said signal pulse is applied for travel in said delay line,
        2. a plurality of spaced taps along its length,
        3. a terminal impedance connected to the end of said delay line remote from said input terminal,
    B. a signal path formed of a counting chain for receiving a scanning signal, C. control circuit means connected to said input terminal and said counting chain to apply said scanning signal to said counting chain, when commanded by said signal pulse through said input terminal, and D. a plurality of detecting or sampling stations, one connected to each tap on the one hand and to said counting chain on the other hand, to be energized at different moments by said scanning signal traveling in said counting chain for sensing an amplitude value of the curve representing said signal pulse, said delay line and said counting chain being constructed in such a manner that the traveling time of said signal pulse between any two adjacent taps is different from the time lag between the energization by said scanning signal of two detecting stations connected to the last named two adjacent taps.

2. An apparatus as defined in claim 1, wherein the value of said impedance is the wave impedance of said delay line.

3. An apparatus as defined in claim 1, wherein said delay line is circular in shape and said signal path is disposed concentrically with and inside said delay line.

4. An apparatus as defined in claim 3, wherein the circle along which said delay line is disposed has a diameter of approximately 30 centimeters.

5. An apparatus as defined in claim 1, wherein said counting chain is formed of a plurality of counting stages, one connected to each detecting station.

6. An apparatus as defined in claim 1, wherein said delay line has nonreciprocal transmission properties.

7. An apparatus as defined in claim 1, wherein said counting chain is a ring counter.

8. An apparatus as defined in claim 1, wherein said counting chain is a shift register.

9. An apparatus as defined in claim 1, wherein said signal path is formed as a delay line.

10. An apparatus as defined in claim 1, wherein each said detecting station is adapted to store said amplitude value sensed thereby.

11. An apparatus as defined in claim 1, wherein said scanning signal is generated in a mixer supplied by a fixed frequency generator and a variable frequency generator.